Oct. 27, 1964 F. LOUZIL 3,154,236
TAPE RECORDER OF THE SELF THREADING TYPE
Filed March 29, 1962
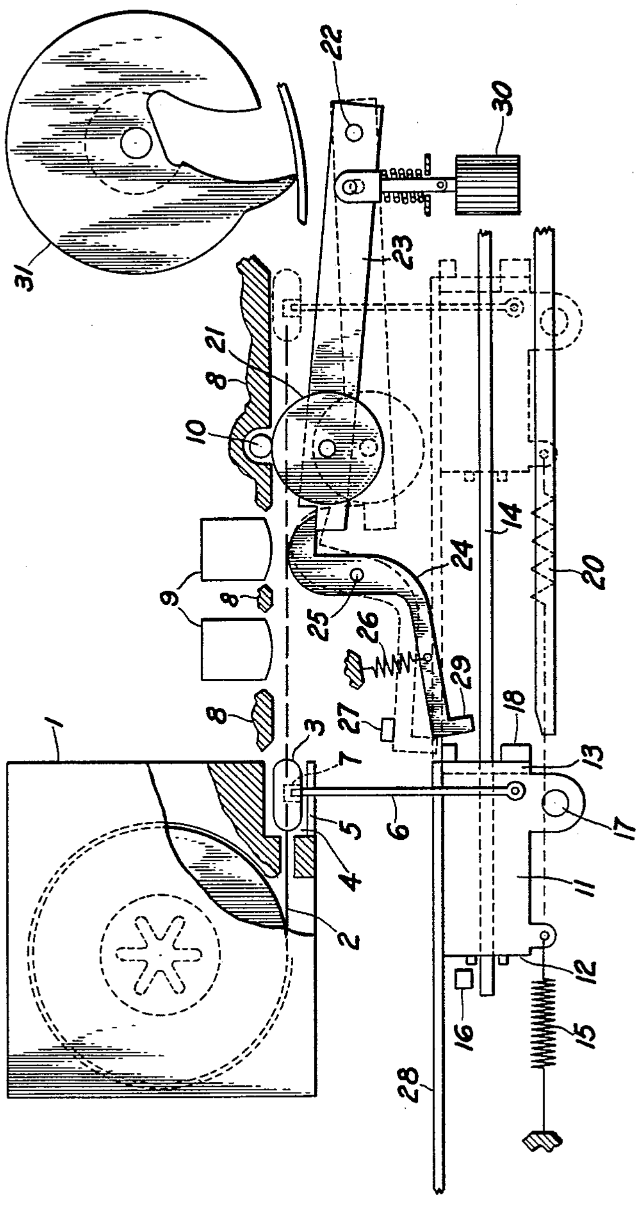
INVENTOR.
FRIEDRICH LOUZIL
BY
Frank R. Trifari
AGENT United States Patent Office 3,154,236
Patented Oct. 27, 1964

3,154,236
TAPE RECORDER OF THE SELF THREADING TYPE

Friedrich Louzil, Vienna, Austria, assignor to North American Philips Company, Inc., New York, N.Y., a corporation of Delaware Filed Mar. 29, 1962, Ser. No. 183,516
Claims priority, application Austria Apr. 4, 1961
3 Claims. (Cl. 226—92)

The invention relates to magnetic tape recording and/or reproducing devices in which the tape is transferred from a supply magazine to a winding reel by means of a tape transmitting device which reciprocates between the supply magazine and the winding device and which can be brought into its initial position adjacent the supply magazine by a spring or the like and in which for transporting the tape during the normal operation of the recorder a transporting shaft capstan is provided against which the tape is pressed during scanning by means of a swingable or slidable pressing roller.

In such recorders, the tape transmitting member which reciprocates between the supply magazine and the winding device for transporting the beginning of the tape to the winding device must pass between the capstan and the pressing roller. This is possible so long as the pressing roller is not pressing. Faulty operation of the device such that first the capstan is switched on and only then the device for gripping and transmitting the beginning of the tape is actuated, the tape transmitting device impacts with its most sensitive part against the pressing roller, which usually results in damages, irrespective of the fact whether the transmission of the device is actuated manually or by a mechanical or electrical drive in the apparatus. Also the danger exists that the tape is being driven before the tape transmitting device is brought back to its initial position adjacent the supply magazine. In this case also, the transmitting device must pass the space between the capstan and the pressing roller which again results in disturbances or damages.

According to the invention, a blocking member is provided which acts upon the tape transmitting device, or on the operating members thereof, and which can be controlled by movement of the pressing roller or its associated means. The blocking member prevents movement of the tape transmitting device from its initial position at the supply magazine whenever the pressing roller is against the capstan.

Preferably, the blocking member is constructed, so that, as soon as the tape transmitting device leaves its initial position, movement of the pressing roller from its displaced position is blocked.

In order that the invention may readily be carried into effect, a presently preferred embodiment thereof will now be described with reference to the accompanying drawing, in which the figure diagrammatically shows a mechanical arrangement according to the invention.

Referring now to the figure, a supply magazine 1 placed on the recorder and comprising the supply of tape, is shown. At the beginning end of the tape 2 a tag 3 is provided for which the space 4 is available in the magazine. This space 4 is also accessible from the side, through an aperture 5 so that a gripping device 6 can can grip the tag 3, for example in a recess 7 in the tag. If the gripping device 6 is moved to the right (as shown in phantom), it transmits the tag 3 along a diagrammatically shown guide 8, past the magnet heads 9 and the capstan 10 to the winding device or take-up reel 31 on the right hand side. The gripping device 6 is secured on a slide 11 which consists, for example, of a U-shaped metal plate. The slide 11 has limbs 12 and 13 each of which have a longitudinal slot, which embraces a guide rail 14 placed on edge. The longitudinal slot in the left hand limb 12 is only as wide as the guide rail 14. The longitudinal slot in the right hand limb 13 is wider, so that the slide can be pivoted about the axis of rotation formed by the slot in the left hand limb 12 so that the gripping member 6 engages the tag 3 as shown. A drawspring 15 and a stop member 16 determine the initial position of the slide adjacent the supply magazine. A handle 17 is provided for pivoting and moving the slide. Two lugs 18 and 19 are formed on the right hand limb 13 of the slide which limits the pivotal movement by impacting against the rail 14. In the pivoted position of the slide 11 as shown in the figure, the gripping device 6 engages the tag 3. A guide rail 20 is provided so that the slide 11 can be held while moved to the right hand side in the pivoted position. The slide 11 maintains itself in the pivoted position shown by means of the lug 18 against the guide rail 20.

The pressing roller 21 is journalled on a lever 23 pivotal about the shaft 22. The inoperative position of roller 21 is shown in dotted lines, its position in the pressed condition in solid lines. Displacement of the lever 23 is effected by conventional switching means such as an electric magnet 30 and associated linkage. A lever 24 pivoted on the shaft 25 which can be brought into its inoperative position by means of a spring 26, and a stop member 27. To prevent the slide 11 from moving out of its initial position when the pressing roller 21 is pressed against the capstan 10 the lever 23 is moved to the position shown in full lines when the pressing roller 21 is moved to its operative position by lever 23 and assumes the position shown in the figure. In this position pivoting of the slide 11 but no movement to the right is permitted. In order that the blocking member 24 can be operative mutually between the slide and the pressing roller, a plate 28 is provided on the slide 11 parallel to the guide rail 14. If the slide is moved to the right with the pressing roller swung back, which is only possible if the blocking lever 24 is in its inoperative position, the lever 24 can no longer be pivoted because its extension 29 impacts against the plate 28. Also, the lever 23 is also held in its inoperative position wherein pressing roller 21 is spaced from capstan 10.

It will be clear that many variations of the above construction are possible without departing from the scope of the invention. For example, the blocking lever 24 could also be brought into mechanical connection with the switch (push button) with which the pressing roller 21 is pressed against the transporting shaft 10 for switching on the operating forward travel of the tape at normal speed, for example by means of a cable or a rod system.

Instead of manually shifting the transmitting device, a mechanical or electrical drive may be provided, for example a cable which is wound on a drivable shaft or a toothed wheel driving as disclosed in co-pending application, Serial No. 114,893 now U.S. patent No. 3,104,843. In said application a mutually operative blocking member according to this invention may be used in the switches for switching on the movement of the device and the pressing roller by using two push buttons, one of which brings the other out of its work position when actuated, the simultaneous pressing of both push buttons being rendered impossible. In case of electromagnetic actuation of both movements, switches may be provided, for example, which when closing one circuit simultaneously open the other circuit.

What is claimed is:

1. In a tape recorder/reproducer of the self threading type the improvement comprising means for transmitting tape from a supply magazine to a take-up reel, a capstan and pressure roller for driving said tape during operation of said recorder, and means for separating said capstan and pressure roller for passage of said transmitting means and tape therebetween; said last named means comprising a pivotal lever supporting said pressure roller, means moving said lever for engaging and separating said pressure roller and said capstan, and a blocking member operatively connected with said pivotal lever for blocking the path of movement of said tape transmitting means when said pressure roller and capstan are engaged and unblocking said path when said pressure roller and capstan are separated.

2. In a tape recorder/reproducer according to claim 1 wherein said blocking member comprises a pivotally supported second lever, biasing means urging said second lever into inoperative position wherein the path of said tape transmitting means is unobstructed, said second lever being urged by said first mentioned lever into the path of said tape transmitting means.

3. In a tape recorder/reproducer of the self threading type the improvement comprising a tape transmitting member pivotally and slidably mounted on said recorder/reproducer, said transmitting member being pivoted into engagement with said tape and being slidably movable between a tape supply holder and a take-up reel, a capstan and pressure roller for driving said tape during operation of said recorder, and means for separating said capstan and pressure roller for passage of said transmitting member and tape therebetween; said last named means comprising a pivotal lever supporting said pressure roller, means moving said pressure roller for engaging and separating said roller and capstan, a pivotal blocking lever connected with said first named lever for movement therewith, said blocking lever having a portion obstructing the path of sliding movement of said transmitting member when said first named lever is positioned to engage said roller and capstan.

References Cited in the file of this patent

UNITED STATES PATENTS

| | | |
|---|---|---|
| 1,685,010 | Thornton | Sept. 18, 1928 |
| 2,345,869 | Edwards | Apr. 4, 1944 |
| 2,891,736 | Blaes | June 23, 1959 |
| 3,006,650 | Ellmore | Oct. 31, 1961 |
| 3,025,011 | Camras | Mar. 13, 1962 |